March 20, 1928.
J. HOPKINSON
WEIGHING METHOD
Filed Feb. 19, 1926
1,663,129
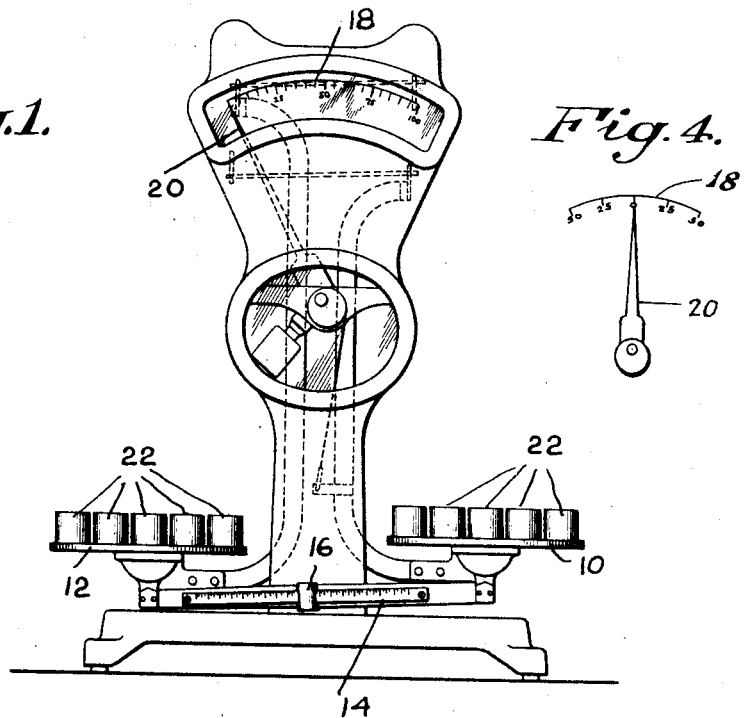
Fig.1.
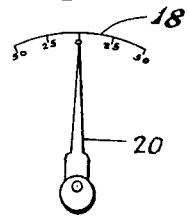
Fig.4.
Fig.2.
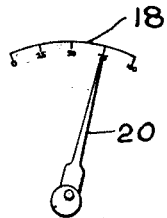
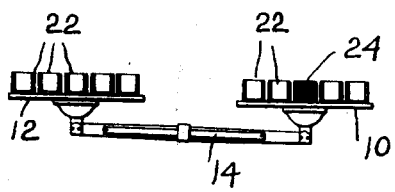
Fig.3.
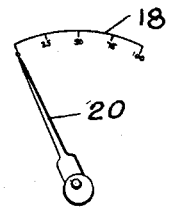
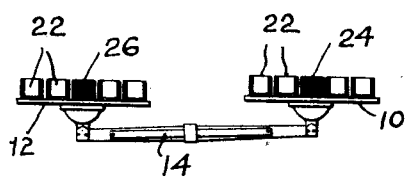
Inventor
Joseph Hopkinson
By his Attorneys
Cooper Kerr & Dunham Patented Mar. 20, 1928.

1,663,129

UNITED STATES PATENT OFFICE.

JOSEPH HOPKINSON, OF DAYTON, OHIO, ASSIGNOR TO DAYTON SCALE COMPANY, OF DAYTON, OHIO, A CORPORATION OF NEW JERSEY.

WEIGHING METHOD.

Application filed February 19, 1926, Serial No. 89,260, and in Germany October 23, 1925.

This invention discloses a new and improved method of using a certain type of automatic weighing scale to accomplish results which have heretofore been accomplished by other methods. In some industries, for instance, drugs or food-stuffs, it is customary to market the goods in even weight packages. The containers themselves vary in weight, but the net weight of the goods or commodity in each container must be accurate and uniform regardless of the variations of weight of the empty containers or packages.

One method of accomplishing the above result has been to use an ordinary scale provided with a tare beam. Then each empty container is balanced by adjusting the tare poise until the scale indicator points to zero, after which the desired net weight of goods is weighed into the package. This method is accurate, but slow and tedious as it requires manipulation of the tare device for each package.

Another method which has been used with free flowing granular materials is to automatically weigh the material in a hopper and then dump or pour it from the hopper into the container. This method is rapid but is subject to inaccuracies of weight due to variations in the density or consistency of the material being handled and to obstruction of the gates or passages through which the material flows to the weigh hopper. This latter method also has the great disadvantage of not disclosing to the operator the weight of each package, wherefore hidden inaccuracies may occur which are not found until too late to rectify.

My method contemplates the use of an even balance automatic scale with a tare beam. The method provides the same accuracy as the method first described above with much of the speed of the second method. It also affords the operator a visual indication of the net weight in each container and thus avoids the great objection to the second method. Instead of having to set the tare poise for every separate package my method enables the operator to fill a plurality of packages with a single setting of the tare beam, as will appear.

In the drawings,

Fig. 1 shows an automatic scale of a type suitable for use with my method.

Figs. 2 and 3 are diagrammatic views illustrating different steps of the process.

Fig. 4 shows a modified form of chart.

The scale is of the even balance or equal arm type having two similar platforms or goods pans 10 and 12, a tare beam 14 provided with a poise 16, a graduated chart 18 and an indicator 20 cooperating with the chart.

For illustrative purposes the chart is shown graduated to 100 units of weight which may be grams. The indicator normally points to zero on the chart when there are no goods on either platform or when both platforms carry the same loads.

In carrying out my method a plurality of empty containers 22 are placed on each of the pans 10 and 12. Preferably the same number of containers is placed on each pan, but that is not essential. The containers need not be of uniform weight. When the scale pans 10 and 12 have been loaded with empty containers, indicator 20 will probably not point to zero, and the next step in the process is to adjust tare poise 16 on beam 14 so that the indicator is at zero, and then the filling of the containers may begin. Assuming that goods to weigh 75 grams are to be placed in each package, one of the containers on pan 10 is filled as at 24 which draws indicator 20 to the right until it points to 75 on chart 18, as in Fig. 2. We then know that that particular package contains 75 grams because the fact is indicated on the chart. Next, one of the containers 26 on pan 12 is filled until the indicator is brought back to zero as in Fig. 3, and we know that package 26 contains 75 grams of commodity because indicator 20 has moved through an arc indicating 75 grams on chart 18. The operation is continued by filling packages alternately on pans 10 and 12 until all the packages on one of the pans are filled.

It will be noted that the weights of the containers themselves are not factors in the operation, that only one setting of the tare beam is necessary for a plurality of net weighments, and that each weighment is indicated on the chart.

In one modification of the process chart 20 has its zero at the middle and is graduated both ways from the middle (Fig. 4). With such a chart a container in either pan 10 or 12 may be first filled. This will draw the indicator to a point to the right or left of zero. If the indicator moves first to the left the filling of a package on the right platform will bring the indicator back to zero, and filling another package on the right will move the indicator to the predetermined point at the right of zero. Then the filling of a package on the left pan will bring the pointer to zero and the filling of a second package on the left will again move the indicator to the proper predetermined graduation on the left side of the chart. When the zero is at the middle of the chart, as above described, two packages may, if desired, be filled on one pan and then two on the other pan, whereas with the zero at the end of the chart as in the drawings, containers must be filled on the two scale pans alternately.

I have described the preferred method of carrying out my invention but it should be understood that modifications of the method may be used. For instance, if the weight of the individual filled package is small compared to the chart capacity, several of the packages on one platform may be filled one at a time and then several on the other platform, so long as the individual fillings are so distributed between the two platforms as to keep the indicator on a graduated portion of the chart, and so long as the fillings of all packages are gauged by equal displacements of the indicator.

The zero mark on the chart is used as a convenient guide in visually noting the travel of the indicator, but to carry out my invention it is not absolutely necessary that the indicator be brought to zero by the tare beam or otherwise. The process may be carried out by noting the location of the indicator when the scale platforms are loaded with empty containers and then seeing that the indicator always travels the same proper distance to right or left which will insure all containers always receiving the same net weight of the commodity.

I claim—

1. The method of apportioning equal parts by weight of a commodity into a plurality of unequal weight containers, which consists of first placing a plurality of empty containers upon each platform of an even balance automatic scale, and then filling single containers on each platform alternately while gauging each filling operation by an observed displacement of the scale indicator which is equal for successive filling operations.

2. The method of apportioning equal parts by weight of a commodity into a plurality of unequal weight containers, which consists of first placing a plurality of empty containers upon each platform of an even balance automatic scale, next adjusting the scale indicator to zero, then filling a single container on one platform until the indicator is displaced a predetermined distance from zero, then filling a single container on the other platform until the indicator is brought back to zero, and then repeating the above filling operation on alternate platforms.

3. The method of apportioning equal parts by weight of a commodity into a plurality of unequal weight containers, which consists of first placing a plurality of empty containers upon each platform of an even balance automatic scale, and then filling single containers on one platform or the other while gauging each filling operation by an observed displacement of the scale indicator in one direction or the other, said indicator displacements being equal for successive operations.

In testimony whereof I hereunto affix my signature.

JOSEPH HOPKINSON.